UNITED STATES PATENT OFFICE.

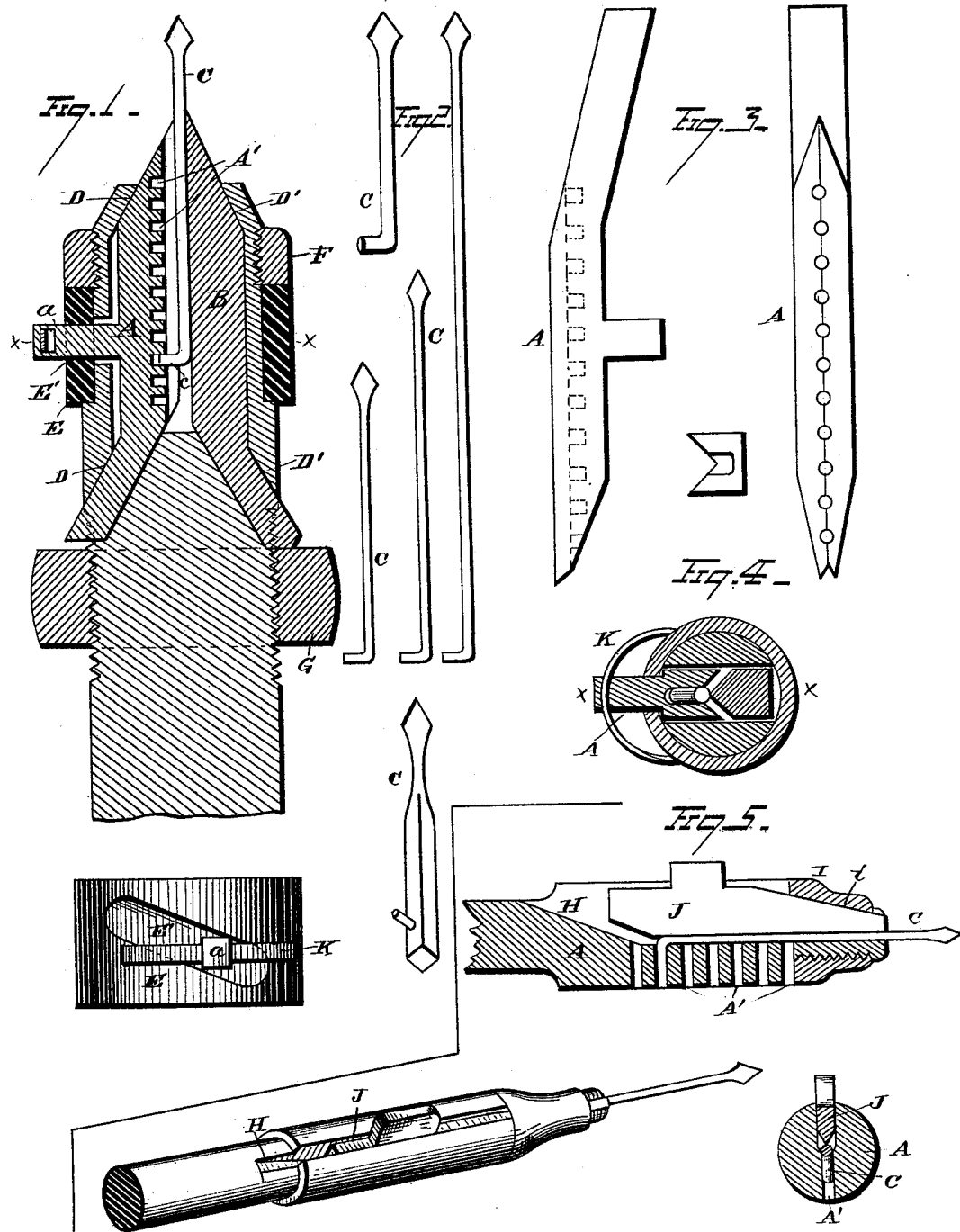

PETER A. RENO, OF DETROIT, MICHIGAN.

DRILL-CHUCK.

SPECIFICATION forming part of Letters Patent No. 234,066, dated November 2, 1880.

Application filed May 8, 1880. (No model.)

*To all whom it may concern:*

Be it known that I, PETER A. RENO, of Detroit, county of Wayne, State of Michigan, have invented a new and useful Improvement in Drill-Chucks; and I declare the following to be a full, clear, and exact description of the same, such as will enable others skilled in the art to which it pertains to make and use it, reference being had to the accompanying drawings, which form a part of this specification.

My invention consists in the combination of devices and appliances hereinafter described, and more particularly pointed out in the claims.

In the drawings, Figure 1 is a longitudinal section of my improved tool-chuck and bit. Fig. 2 is a separate view of my drill-bits. Fig. 3 is a separate view of one of the jaws, showing the recesses for the insertion of the end of the bit; Fig. 4, a cross-section of the chuck. Fig. 5 is a variation adapted for a single size of bits.

The object of this invention is to render available a cheaper form of bit for ordinary drill-work, such as is employed in the manufacture of stoves, &c.

Heretofore it has been customary in this class of work to make the bit of steel and form upon it a square or angular shank to fit a corresponding cavity between the jaws, or else the bit has been made of steel wire, and a sharp edge upon one jaw is by pressure forced into the face of the wire shank of the bit, thereby preventing it from turning within the chuck. The former method, however, is very expensive, while by the latter method the sharp edge of the chuck-jaw will soon become blunted and fail to firmly hold the bit. I propose to overcome both these difficulties by forming the bits of ordinary steel wire with the extreme end of the shank portion of the wire bent at right angles, so as to enter a corresponding hole in one of the jaws of the chuck, thereby effectually preventing the bit from turning within the jaws, the office of the other jaw being simply to hold the tool firmly within its seat.

A and B represent the jaws of a chuck. A' represents holes or recesses in the jaw A for receiving the end or teat $c$ of the bit C.

The bits are formed of plain wire, one end being shaped as a bit and the other end turned at right angles, so as to constitute a teat suitable for entering the orifices A'.

The jaw A has a number of the orifices, so as to accommodate a greater or less length of the bit-shank, for when the work can be brought close to the end of the chuck the bit may be made short by extending its shank well up into the jaws; but when the part to be drilled cannot be brought close to the chuck the same bit may be employed by inserting the teat into one of the orifices near the end of the chuck, so as to take in but a short length of the bit-shank. These bits and perforated jaws may be employed with any kind of a drill-chuck, and I do not, therefore, in their use limit myself to any particular construction of chuck. I have, however, found the device illustrated in the drawings to be a good form of chuck for the purpose, in which the jaws A and B are each housed within inclined guides D D', which maintain the opposite faces of the two jaws always exactly parallel to each other, and parallel, also, to the proper line of direction of the bit when in use.

The object of making both the jaws movable is to enable them to be centered with bits of different diameters.

$a$ is a stud projecting from the jaw A and passing through an inclined slot, E', in the collar E, so that by turning the collar the jaw A is caused to move to or from the other jaw by sliding toward or from the end of the chuck, and a jam-nut, F, or other suitable contrivance, may be employed to bind the collar E and set the jaw A firmly in position when properly centered. The other jaw, B, may be made loose, so as to readily separate from the jaw A and admit of a bit being inserted.

A nut or follower, G, or other suitable contrivance, is provided for running down against the end of the jaw and forcing it snugly and securely against the bit to hold the latter in place when being used.

It will be observed that when the jaw A is set for one diameter of bit it does not thereafter have to be altered until a new diameter of bit is required.

The edge of the jaw B may be plain, or it may be serrated so as to insure a perfect bearing along the whole length of the bit-shank.

The operation of the device is apparent. The nut or clamp G is run up so as to free the jaw B, the jaw is lifted, and a bit is inserted and its bent end or teat is introduced into any one of the holes A'. The jaw B is now brought in against the bit and forced tight by the clamp or nut G.

A bit of the character shown is a very simple device and can be made in a few minutes by any ordinary workman. It is, moreover, so cheap that its breakage creates but a trifling loss. Moreover, the chuck may be simplified, and its wear is greatly reduced, owing to the fact that it does not have to be clamped so tightly as to hold the bit from turning by friction alone, as heretofore, but only sufficiently tight to prevent play, as the teat now serves effectually to prevent turning.

This device may be employed to good advantage in working with any kind of material, whether wood or metal, where bits and chucks are employed.

In Fig. 5 is shown a cheap form of chuck adapted for holding bits of the same sectional size. It consists simply of a stock with a groove, H, formed in one side and properly located so as to form in a single piece with the stock the jaw A, and a nut or other suitable device, I, provided with an incline, i, is run upon the end of the stock and permanently fastened in place, as shown. A key, J, constituting the other jaw, is made to enter the slot H from behind, and is forced with a gentle tap of a hammer down firmly upon the bit. The stock and the nut I may be made in a single piece, if desired.

Instead of employing bits with round shanks, the device is equally applicable to bits with square or other angular shanks; and instead of forming the teat by bending the shank end of the bit, it may be formed by drilling into the side of the bit-shank and inserting a pin which shall project therefrom. And I would have my use of the term "teat" understood as comprehending any such construction in which a part of the metal is caused to project to one side of the shank.

K is a spring, or any other suitable device for holding the jaw A against its inclined bearings.

What I claim is—

1. A chuck having one of its jaws provided with a hole and the opposite jaw made plain, in combination with a bit having a round shank, and a teat extending laterally from one side only of the bit, said teat adapted to fit into the hole in the jaw, substantially as set forth.

2. A chuck having one of its jaws provided with a series of holes, in combination with a bit having a cylindrical shank and a teat extending laterally from one side only of the bit, said teat adapted to fit into any one of the holes in said jaw, substantially as set forth.

3. A drill-chuck composed of a jaw, A, with adjusting device E, and jam-nut or clamp F, in combination with the loose jaw B, tightening-nut or follower G, and inclined guides for giving direction to the jaws, substantially as described.

In testimony whereof I sign this specification in the presence of two witnesses.

PETER A. RENO.

Witnesses:
WILLIAM M. PORTER,
S. E. THOMAS.